(12) United States Patent
Oishi et al.

(10) Patent No.: US 7,361,110 B2
(45) Date of Patent: *Apr. 22, 2008

(54) BICYCLE DERAILLEUR

(75) Inventors: Toshinari Oishi, Sakai (JP); Takashi Adachi, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 734 days.

This patent is subject to a terminal disclaimer.

(21) Appl. No.: 10/872,297

(22) Filed: Jun. 17, 2004

(65) Prior Publication Data

US 2005/0218623 A1    Oct. 6, 2005

(30) Foreign Application Priority Data

Feb. 26, 2004    (JP)    .............................. 2004-051491

(51) Int. Cl.
*F16H 9/00* (2006.01)
*B62M 9/12* (2006.01)

(52) U.S. Cl. ...................................... 474/82

(58) Field of Classification Search ............ 474/78–82, 474/69–70

See application file for complete search history.

(56) References Cited

U.S. PATENT DOCUMENTS 2,598,557 A * 5/1952 Juy .............................. 474/80
3,181,383 A * 5/1965 Juy .............................. 474/82
3,896,679 A * 7/1975 Huret et al. ................... 474/82
4,575,365 A    3/1986 Nagano ......................... 474/80
4,637,808 A * 1/1987 Nakamura .................... 474/80
D424,984 S *  5/2000 Hanamura ................. D12/124
6,287,228 B1* 9/2001 Ichida .......................... 474/82

FOREIGN PATENT DOCUMENTS

| EP | 1568586 A2 * | 8/2005 |
| JP | 07156855 A * | 6/1995 |
| JP | 08020375 A * | 1/1996 |

* cited by examiner

*Primary Examiner*—Marcus Charles
(74) *Attorney, Agent, or Firm*—Jeffer Mangels; Butler & Marmaro LLP (57) ABSTRACT

A bicycle rear derailleur equipped with a base component, a link mechanism, a movable component, outer plate, inner plate, guide pulley, and tension pulley. The base component is mounted on the frame and one end of the link mechanism is mounted on the base component. The movable component is mounted on the other end of the link mechanism, and can be relatively displaced from the base component. The outer plate is mounted on the movable component so as to undulate like a see-saw. The guide pulley is mounted between the plates, so as to freely rotate and move in the axial direction. The tension pulley can be engaged with the chain, the engagement center of which is set at a position closer to the outer plate than to the engagement center of the guide pulley, and is mounted between the plates, so as to freely rotate.

20 Claims, 10 Drawing Sheets

BICYCLE DERAILLEUR

FIELD OF THE INVENTION

The present invention relates to a derailleur, in particular to a bicycle rear derailleur which is mounted onto a bicycle frame so as to selectively derail the chain resting upon any of a multiple number of sprockets mounted onto a rear hub axis.

BACKGROUND OF THE INVENTION

An externally-mounted speed changing device, or rear derailleur, is mounted onto a bicycle, especially onto a sports-type road racer or mountain bike. Such rear derailleur is equipped with a base component, which is mounted on the frame; a link mechanism, one end of which is mounted on the base component; a movable component, which is mounted on the other end of the link mechanism, and which can be relatively displaced from the aforementioned base component; and a chain guide, which is mounted on the movable component so as to undulate like a see-saw. The chain guide functions to transfer the chain, so as to derail the chain upon any of the rear sprockets. The chain guide is equipped with an outer plate, which is mounted on the movable component so as to undulate like a see-saw; an inner plate, which is installed so as to face the outer plate; a guide pulley, which is mounted onto a portion on one edge of the plates, between the plates, so as to freely rotate, and which can be engaged by means of the chain; and a tension pulley, which can be engaged with the aforementioned chain, and which is mounted onto a portion on the other edge of the aforementioned plates, between the plates, so as to freely rotate.

With respect to the rear derailleur structured according to the above-stated manner, a rear derailleur in which the guide pulley is mounted between the plates so as to freely move in the axial direction is well known. See Official Gazette for Kokai Utility Model Application No.:1990-10075. In the case in which the guide pulley is mounted so as to freely move in the axial direction, even when the guide pulley does not match the center of the rear sprocket due to a failed adjustment, the guide pulley is shifted to the appropriate position by means of the chain's tension. Thus, even when the derailleur is not adjusted appropriately, noise generated from the chain when it comes into contact with the rear sprocket can be prevented, and the chain may be smoothly guided.

In the traditional structure, under certain conditions, the shift of the guide pulley to the outer axial direction is occasionally conducted improperly. Such tendency is occasionally exhibited particularly on the top side of the rear sprocket, where the tension of the chain becomes weak. When the shift of the guide pulley to the outer axial direction is hindered in this manner, the guide pulley is not positioned at the center of the rear sprocket. Consequently, a noise occurs, and the chain is subject to improper guidance.

The purpose of the present invention is to render it possible to smoothly guide the chain to the rear sprocket.

SUMMARY OF THE PREFERRED EMBODIMENTS

In accordance with a preferred embodiment of the present invention, a bicycle rear derailleur is provided which is mounted onto a bicycle frame in order to selectively derail the chain resting upon any of a multiple number of sprockets mounted onto a rear hub axis, and which is equipped with a base component, a link mechanism, a movable component, an outer plate, an inner plate, a guide pulley, and a tension pulley. The base component is mounted onto the frame. One end of the link mechanism is mounted onto the base component. The movable component is mounted onto the other end of the link mechanism, and can be relatively displaced from the base component. The outer plate is mounted unto the movable component so as to undulate like a see-saw. The inner plate is installed so as to face the outer plate. The guide pulley is mounted onto a portion on one edge of the plates, between the plates, so as to freely rotate and freely move in the axial direction, and can be engaged by means of the chain. The tension pulley can be engaged with the chain and has an engagement center which is offset from the engagement center of the guide pulley in a direction towards the outer plate; the tension pulley is mounted onto a portion on the other edge of the plates, between the plates, so as to freely rotate.

In this rear derailleur, when the pedals are pushed, the chain is guided from any of the sprockets of the front chain wheel, through the tension pulley, to the guide pulley, so as to be derailed upon any one of the rear sprockets.

Even under conditions in which the tension of the chain becomes weaker—in other words, when the chain is engaged with the smallest diameter top sprocket, because the engagement center of the tension pulley is offset from the engagement center of the guide pulley in a direction towards the outer plate, the guide pulley is more easily pulled outwards through the chain. Herein, because the engagement center of the tension pulley is offset from the engagement center of the guide pulley in a direction towards the outer plate, the guide pulley is more easily pulled outwards by the chain, and the guide pulley is more easily shifted outwards, even when the tension of the chain is weak. Therefore, the chain can be guided to the rear sprocket more smoothly.

In additional preferred embodiments, the side of the outer plate onto which the tension pulley is mounted curves midway outwards, so as to be positioned farther outwards than the side onto which the aforementioned guide pulley is mounted. By curving the outer plate, the tension pulley can be positioned outwards as compared to the position of the guide pulley.

In other preferred embodiments, the engagement center of the tension pulley is offset from the engagement center of the guide pulley in a direction towards the outer plate when the guide pulley is located at a position closest to the outer plate. Because the tension pulley is positioned even further outwards, even when the guide pulley is positioned outwards, the guide pulley can be shifted outwards with a higher degree of certainty.

In still other preferred embodiments, when the guide pulley is located at a position closest to the outer plate, the engagement center of the tension pulley is offset from the engagement center of the guide pulley by more than 0.5 mm in a direction towards the outer plate. In accordance with these preferred embodiments, because the offset of the tension pulley is more than 0.5 mm, the guide pulley can be shifted outwards with an even higher degree of certainty.

In additional preferred embodiments, when the guide pulley is located at a position closest to the inner plate, the engagement center of the tension pulley is offset from the engagement center of the guide pulley by less than 2.0 mm in a direction towards the outer plate. In accordance with these preferred embodiments, because the engagement center of the tension pulley is offset by less than 2.0 mm, the guide pulley can be shifted outwards, no matter what position in the axial direction the guide pulley might be positioned in.

According to the present invention, because the engagement center of the tension pulley is offset from the engagement center of the guide pulley in a direction towards the outer plate, the guide pulley is more easily pulled outwards by the chain, and the guide pulley is more easily shifted outwards, even when the tension of the chain is weak. Therefore, the chain can be guided to the rear sprocket more smoothly.

DETAILED DESCRIPTION OF THE PREFERRED EMBODIMENTS

Figure 1:
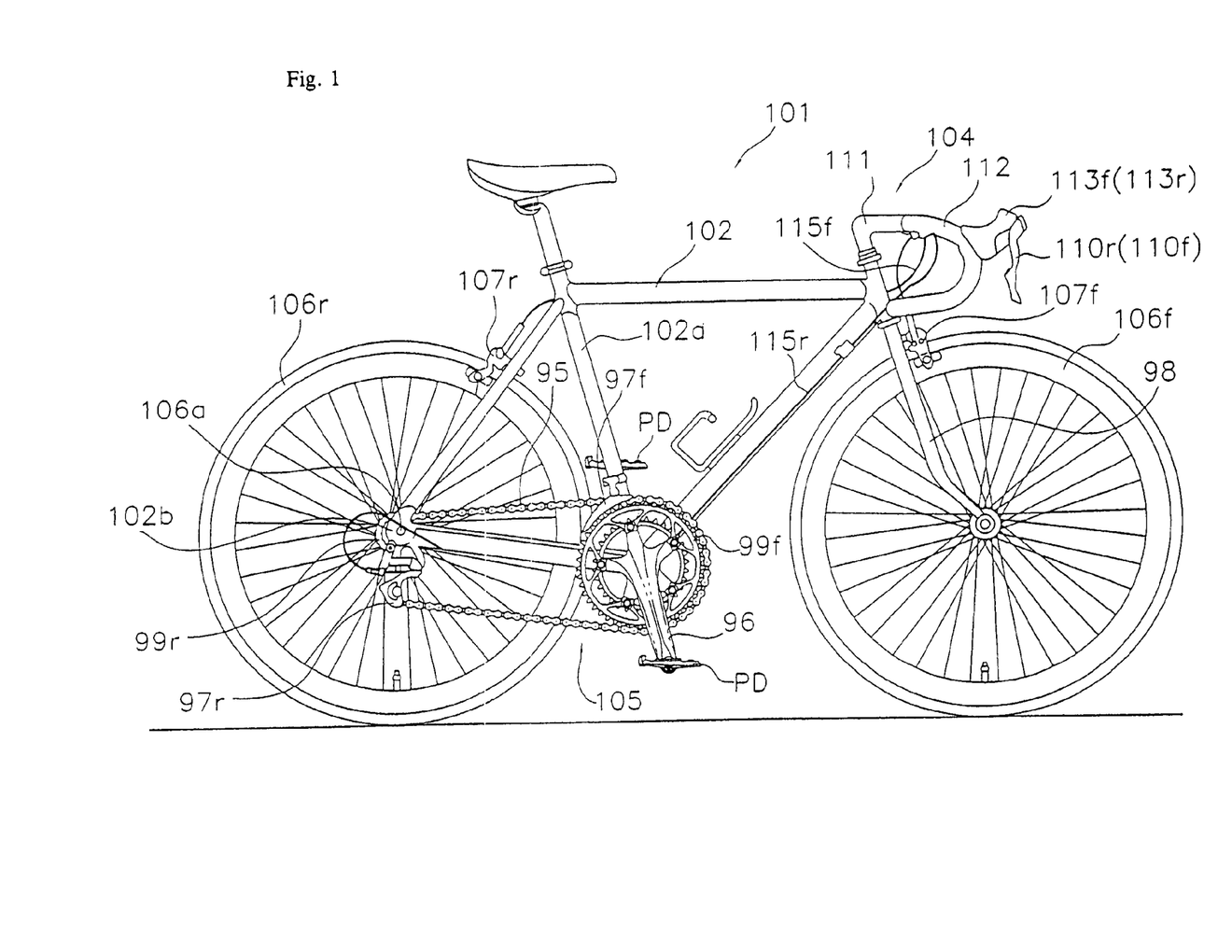
FIG. 1 is a side view of a bicycle to which a preferred embodiment of the present invention has been applied.

In FIG. 1, Bicycle 101, to which a preferred embodiment of the present invention is applied, is a road racer. The bicycle is equipped with diamond-shaped Frame 102, which is equipped with Front Fork 98; Handle 104, which is affixed to Front Fork 98; Driver 105, which consists of Crank 96 equipped with Chain 95, pedals PD, and other components, Front and Rear Derailleurs 97$f$ and 97$r$, Front and Rear Sprocket Blocks 99$f$ and 99$r$, and other parts; Front and Rear Wheels 106$f$ and 106$r$, which are mounted on Front Fork 98 and the rear portion of Frame 102; along with Front and Rear Brakes 107$f$ and 107$r$, and Gear Shifters 110$f$ and 110$r$, which control the shifting of gears of the Front and Rear Derailleurs 97$f$ and 97$r$.

Handle 104 is structured by means of Handle Stem 111 and Handle Bar 112, which is joined together with and affixed to the upper portion of Handle Stem 111. Handle Stem 111 is joined together with and fixated onto the upper portion of the Front Fork 98. Drop-handle type Handle Bar 112 is equipped with a pair of right and left Brake Levers 113$f$ and 113$r$. Onto these Brake Bars 113$f$ and 113$r$, Gear Shifters 110$f$ and 110$r$ are mounted. Gear Shifters 110$f$ and 110$r$ are connected to Front and Rear Derailleurs 97$f$ and 97$r$ by means of Gear Cables 115$f$ and 115$r$.

Driver 105, as stated previously, includes Chain 95; Front and Rear Derailleurs 97$f$ and 97$r$, which derail Chain 95 onto different gears; and Front and Rear Sprocket Blocks 99$f$ and 99$r$. Front Derailleur 97$f$ is installed on Seat Tube 102$a$ of Frame 102, and is set at two gears by Gear Shifter 110$f$ so as to guide Chain 95. Rear Derailleur 97$r$ is installed on Rear Fork End 102$b$ of Frame 102, and is set at ten gears by Gear Shifter 10$f$ so as to guide Chain 95.

Figure 2:
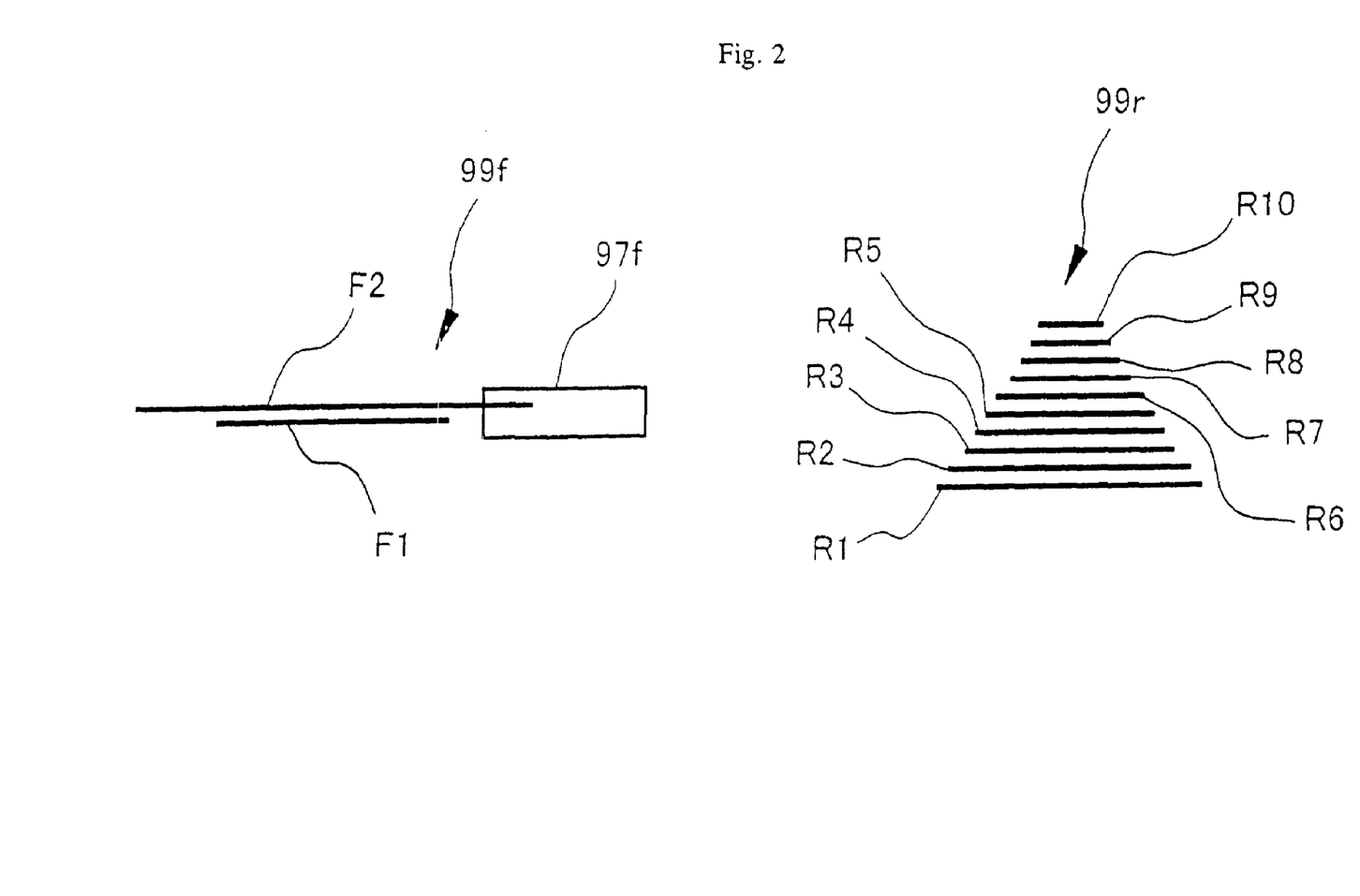
FIG. 2 is a schematic diagram showing an example of the sprocket arrangement of the above.

Front Sprocket Block 99$f$, as shown in FIG. 2, is equipped with two Sprockets F1 and F2, which are arranged in a line in the axial direction of the crank shaft, and which have different numbers of teeth. Rear Sprocket Block 99$r$ is equipped with ten Sprockets R1 to R10, which are arranged in a line in the axial direction along with Hub Axis 106$a$ of the rear wheel, and which have different numbers of teeth. Herein, inner Sprocket F1 has fewer teeth than does outer Sprocket F2. Moreover, the number of teeth gradually decreases as the sprockets advance from innermost Sprocket R1; the outermost top Sprocket R10 has the fewest number of teeth. Front and Rear Derailleurs 97$f$ and 97$r$ derail Chain 95 onto either one of the multiple Sprockets, F1 and F2, and R1 to R10, in order to shift gears. This gear shift is conducted by Gear Shifters 110$f$ and 110$r$, by utilizing Brake Levers 113$f$ and 113$r$.

Figure 3:
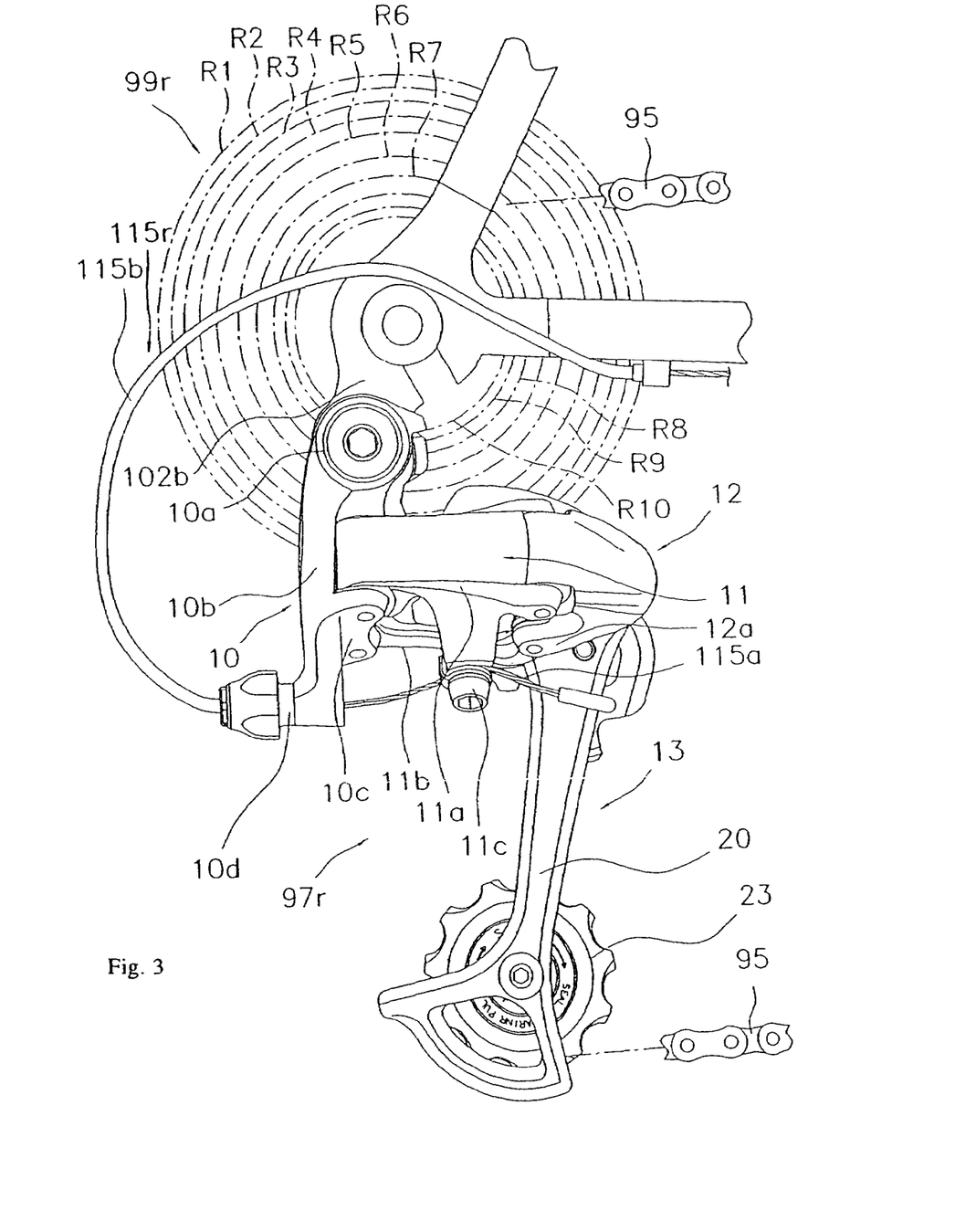
FIG. 3 is a side view of the rear derailleur according to a preferred embodiment of the present invention.
Figure 4:
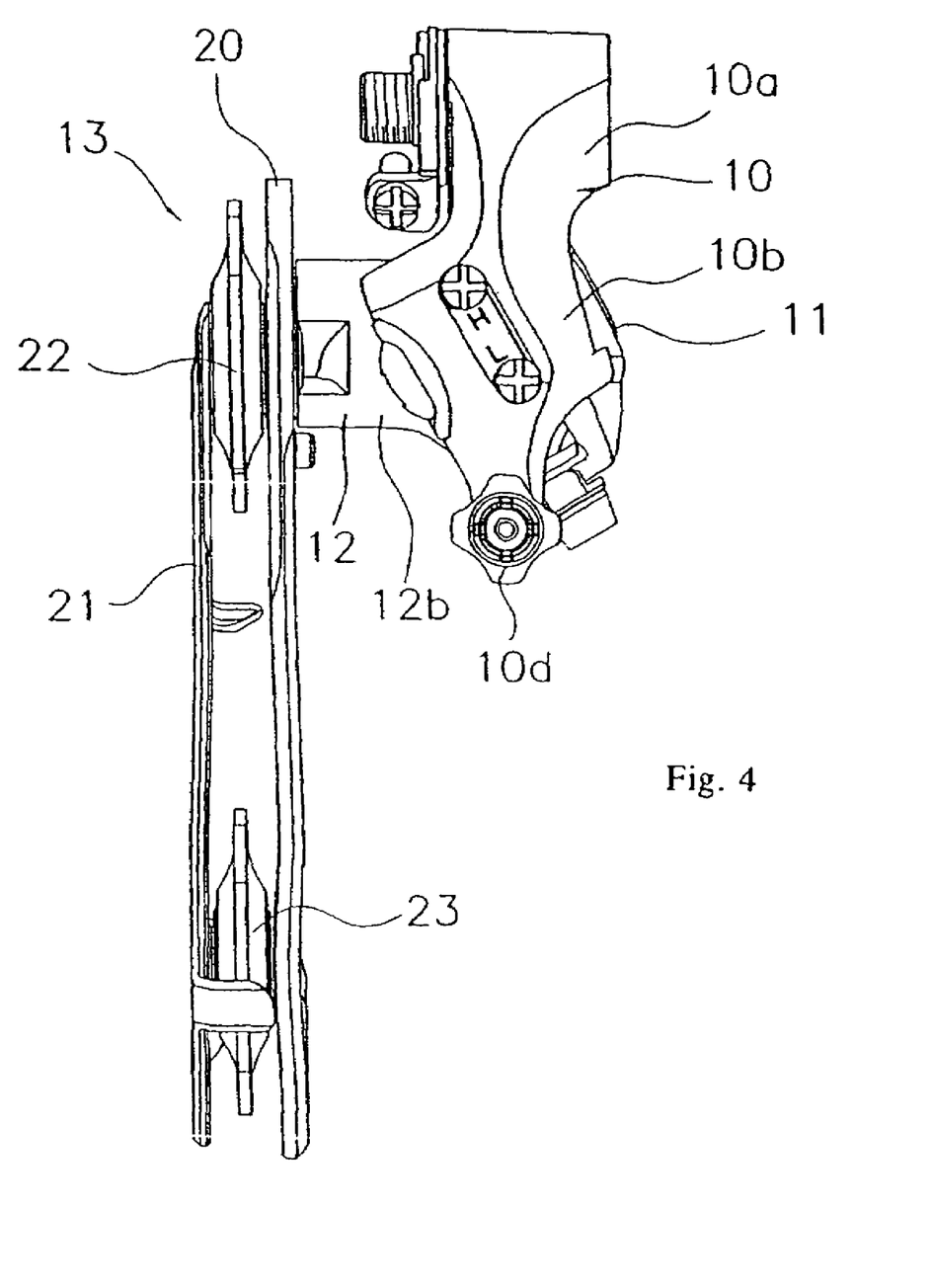
FIG. 4 is a back view of the above.

Rear Derailleur 97$r$ is mounted onto Rear Fork End 102$b$, formed on the rear portion of Frame 102; it selectively derails Chain 95 upon either one of the multiple Sprockets R1 to R10 in Rear Sprocket Block 99$r$. As shown in FIGS. 3 and 4, Rear Derailleur 97$r$ is equipped with Base Component 10, which is screwed into and mounted onto Fork End 102$b$; Link Mechanism 11, one end of which is mounted onto Base Component 10; Movable Component 12, which is mounted onto another end of Link Mechanism 11 and which can be relatively displaced from Base Component 10; and Chain Guide 13, which is mounted unto Movable Component 12 so as to undulate like a see-saw. Chain Guide 13 functions to shift Chain 95, so that Chain 95 becomes derailed upon any of Sprockets R1 to R10.

As shown in FIGS. 3 and 4, Base Component 10 is equipped with Boss 10$a$, which is cylindrical in shape, and which is screwed into Fork End 102$b$ of Frame 102; as well as Arm 10$b$, which extends from Boss 10$a$ in the radial direction. On the point of Arm 10$b$, Link Supporter 10$c$, which functions to mount Link Mechanism 11, is formed. Moreover, on the point of Arm 10$b$, Outer Latch 10$d$, which functions to latch Outer Casing 115$b$ of Gear Cable 115$r$, is formed.

Link Mechanism 11 is a four-point link mechanism, in which Movable Component 12 is connected to Base Component 10 in such a manner that Movable Component 12 may be relatively displaced from Base Component 10. Link Mechanism 11 is equipped with External Link Component 11$a$ and Internal Link Component 11$b$, one end of which is mounted to the lower edge of Base Component 10 through Link Supporter 10$c$ so as to undulate like a see-saw. The other end of these Link Components 11$a$ and 11$b$ is mounted to Link Supporter 12$a$ of Movable Component 12 (stated later), so as to undulate like a see-saw. Link Components 11$a$ and 11$b$ are energized by means of coil springs (not shown in the figures), installed so that they mutually face each other towards the smallest diameter Sprocket R10. On External Link Component 11$a$, Inner Latch 11$c$, which functions to latch Inner Cable 115$a$ of Gear Cable 115$r$, is formed.

Movable Component 12 functions to mount Chain Guide 13 on an axis substantially parallel to Hub Axis 106$a$ of Rear Wheel 106$r$, so as to undulate like a see-saw. Movable Component 12 is equipped with Link Supporter 12$a$, on which both Link Components 11$a$ and 11$b$ of the Link Mechanism are mounted so as to undulate like a see-saw. Movable Component 12 is also equipped with Guide Mounting Unit 12$b$, on which Chain Guide 13 is mounted so as to undulate like a see-saw. On the inside of Guide Mounting Unit 12$b$, a torsion coil spring (not shown in Figures) is mounted, and Chain Guide 13 is energized by means of the torsion coil spring in a clockwise direction, as seen from the outside. With this structure, tension is placed onto Chain 95, so that Chain 95 is less likely to fall off from Sprockets R1 to R10.

Figure 5:
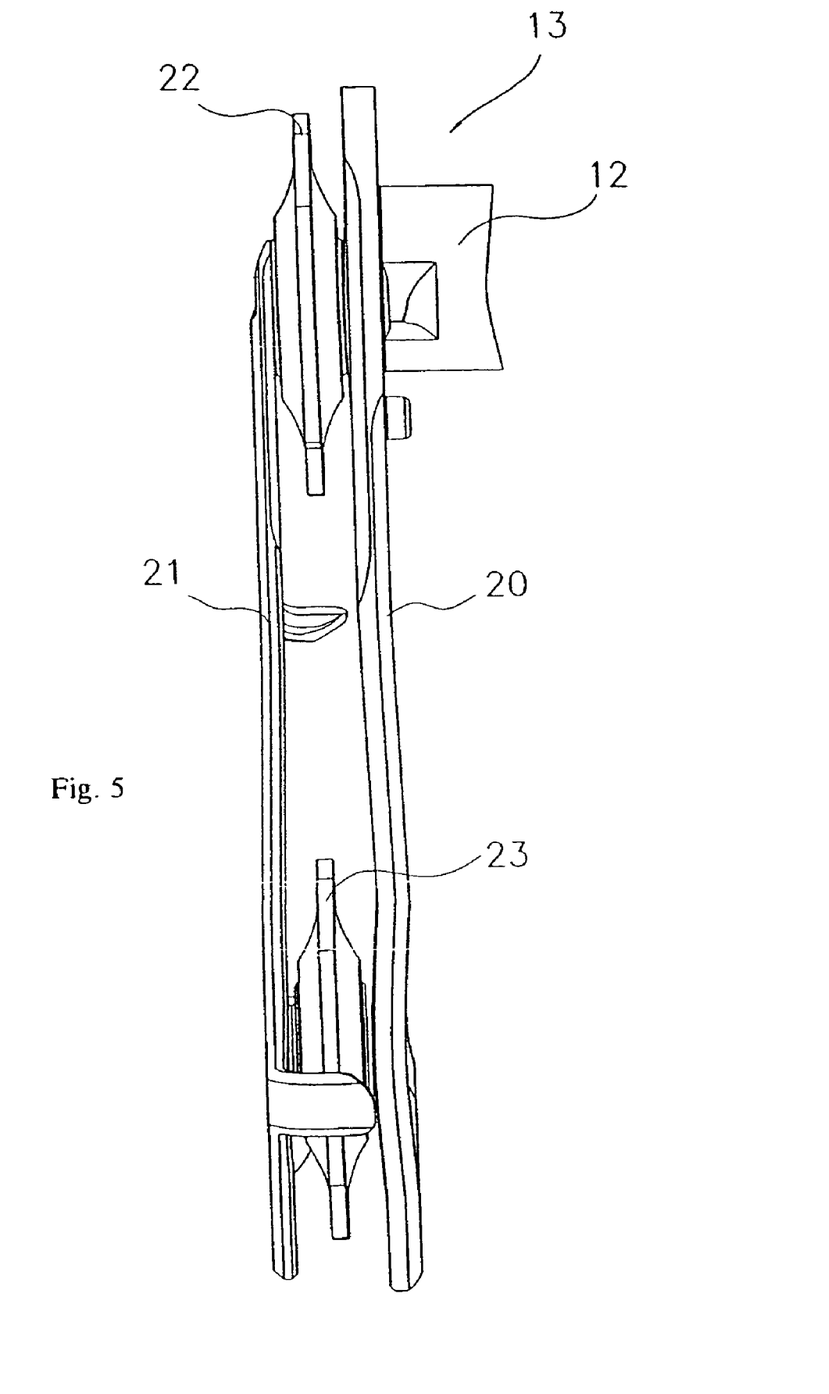
FIG. 5 is a back view of the chain guide.

As shown in FIG. 5, Chain Guide 13 is equipped with Outer Plate 20, which is mounted on Movable Component 12 so as to undulate like a see-saw; Inner Plate 21, which is installed so as to face Outer Plate 20; Guide Pulley 22, which is mounted onto a portion on one edge of Outer Plate 20 and Inner Plate 21, between the plates, so as to freely rotate and move in the axial direction, and which can be engaged with the chain; and Tension Pulley 23, which can be engaged with Chain 95, and which is mounted onto a portion on the other edge of Outer Plate 20 and Inner Plate 21, between the plates, so as to freely rotate.

Figure 6:
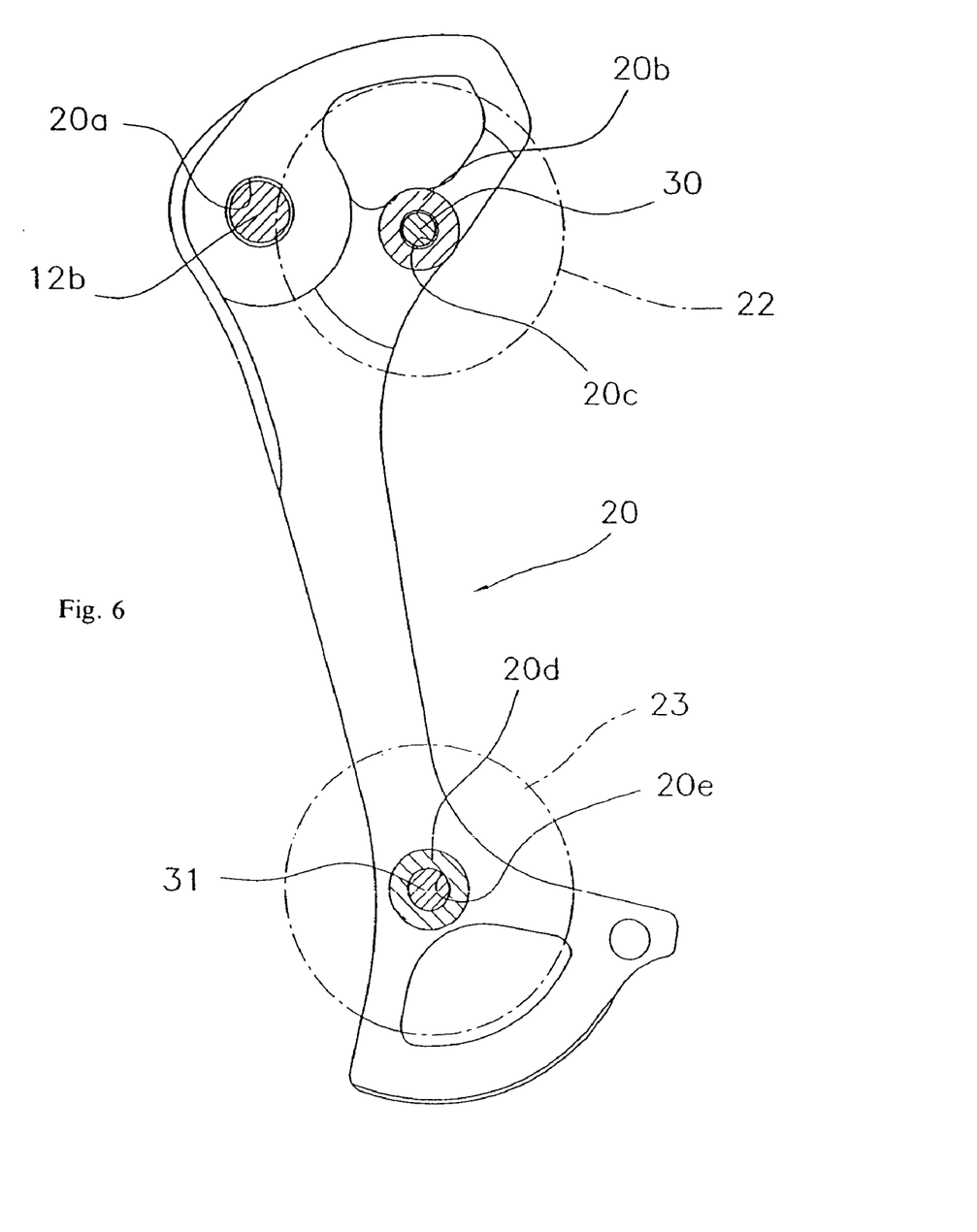
FIG. 6 is a right side view of the outer plate.
Figure 7:
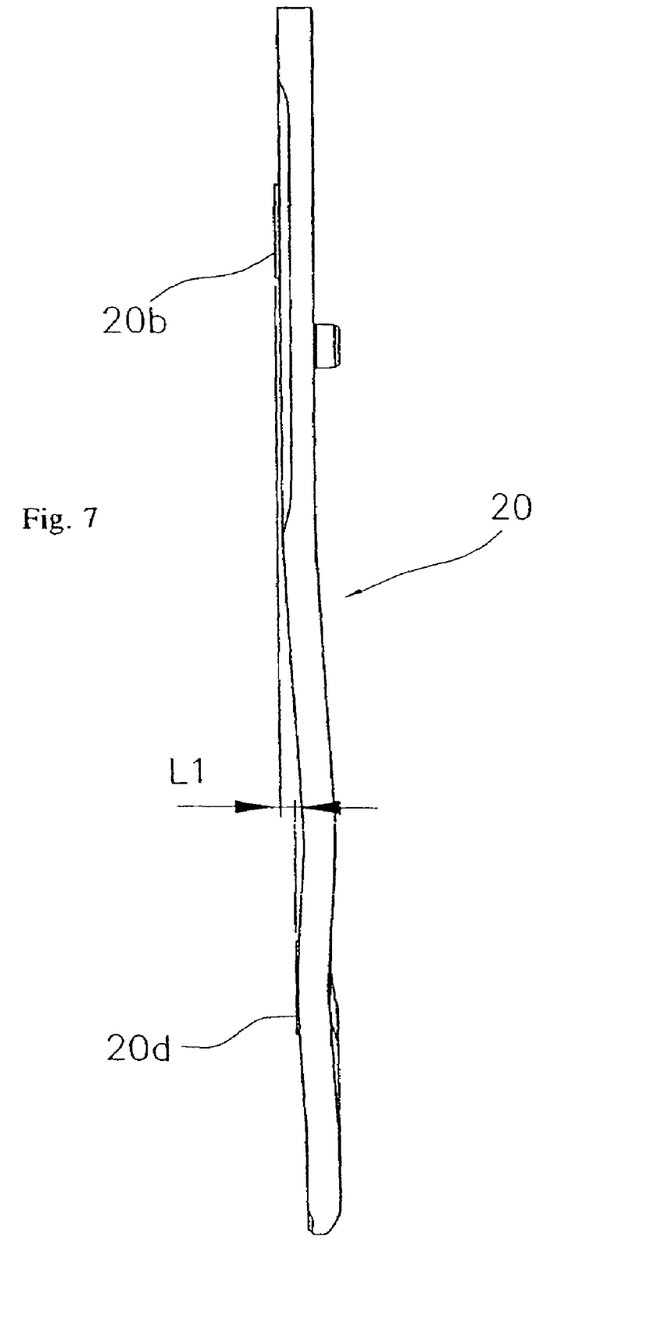
FIG. 7 is a back view of the above.
Figure 10:
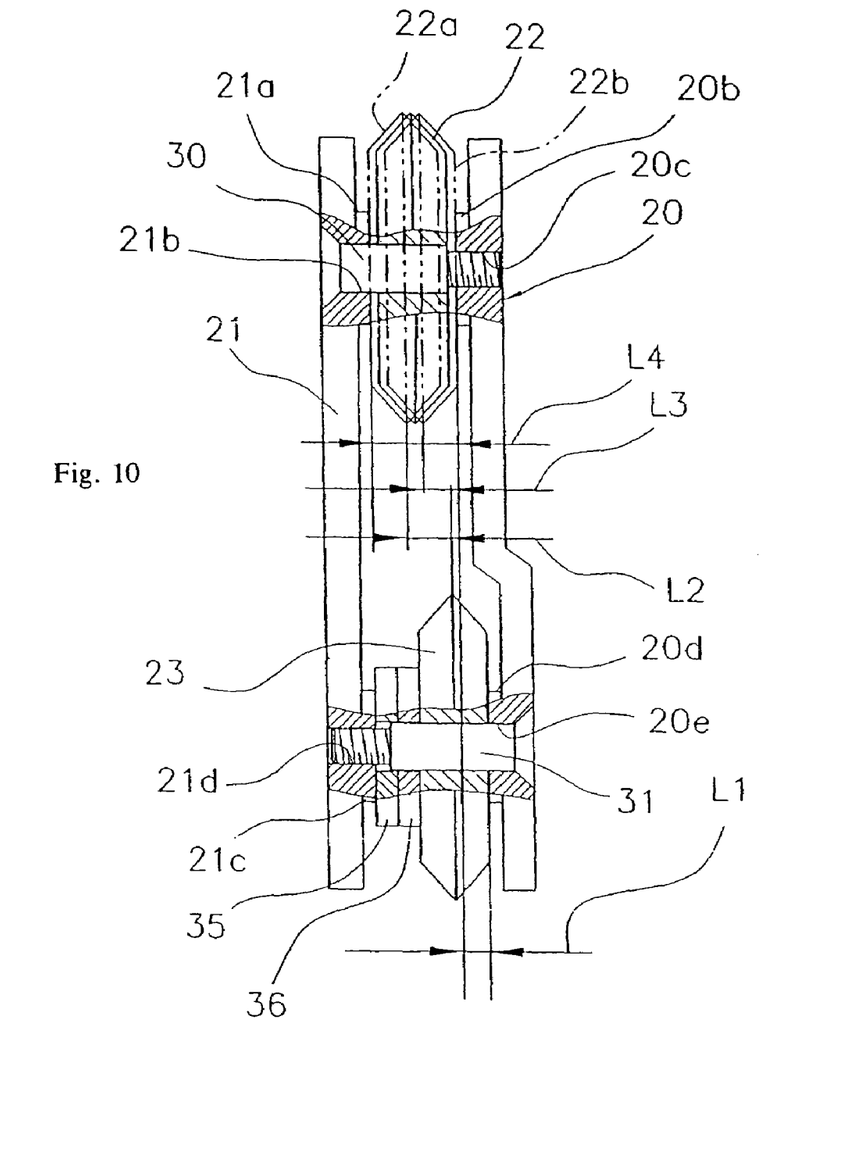
FIG. 10 is a schematic back partial cross-sectional view.

As shown in FIGS. 6, 7, and 10, Outer Plate 20 is a component which is formed by the press-molding of light-weight metals, such as aluminum alloy. FIG. 6 is a view of Outer Plate 20 as seen from the inside. The lower end of Outer Plate 20 slightly curves outwards as compared to the other end. On one end of Outer Plate 20, Undulation Supporter 20a, which is mounted onto Movable Component 12 so as to undulate like a see-saw, is formed. Moreover, next to Undulation Supporter 20a, First Boss 20b, which supports Guide Pulley 22 in a freely rotatable manner, is formed. On First Boss 20b, Female Screw 20c, into which Supporting Axis 30 of Guide Pulley 22 is screwed, is formed. On another end of Outer Plate 20, Second Boss 20d, which supports Tension Pulley 23 in a freely rotatable manner, is formed. On Second Boss 20d, Pass-through Hole 20e, through which Supporting Axis 31 which supports Tension Pulley 23 passes, is formed. Second Boss 20d is positioned at a position offset outwards from First Boss 20b by Distance L1. This Distance L1 lies in a range from 1 mm to 1.5 mm, and is preferably approximately 1.25 mm.

Figure 8:
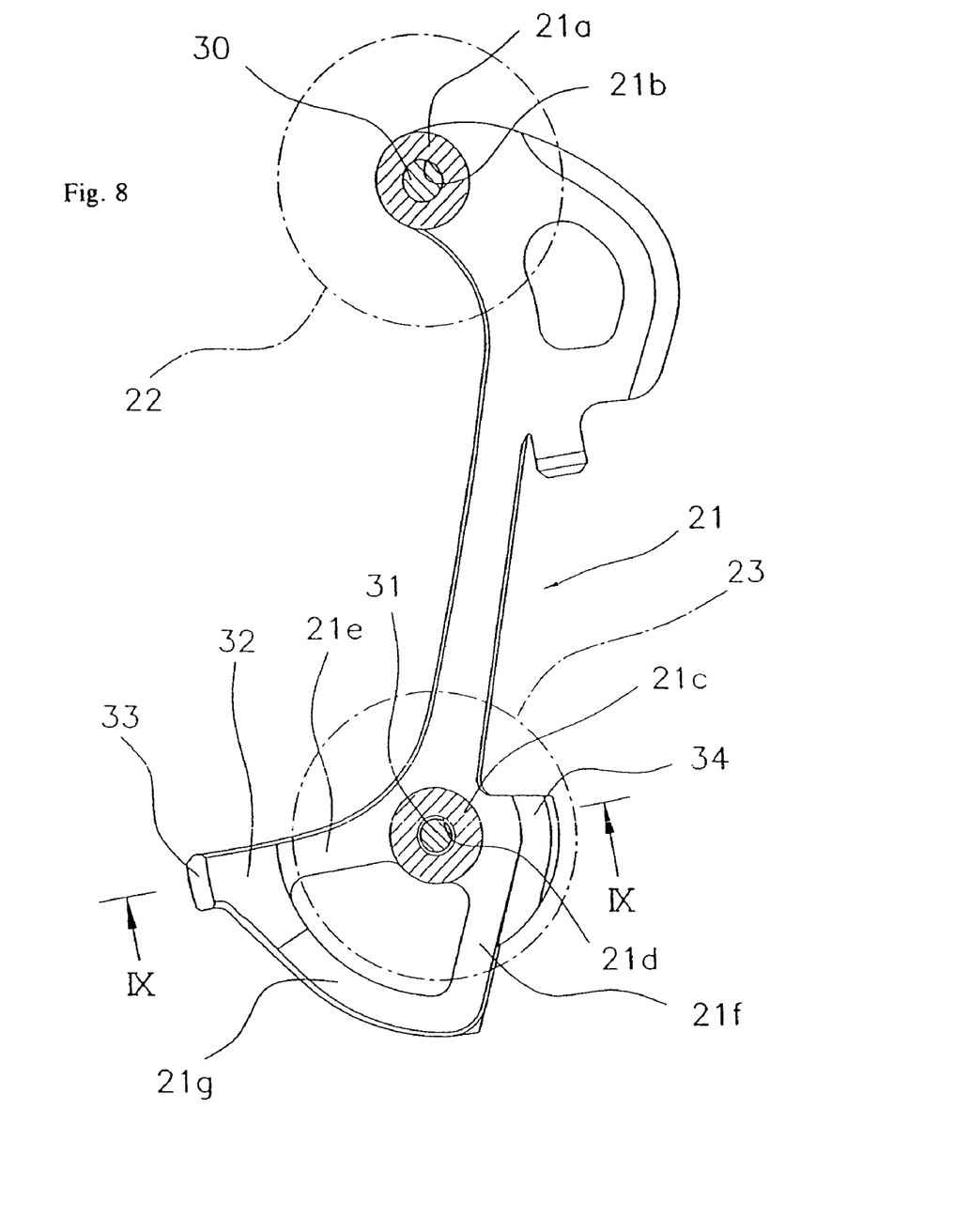
FIG. 8 is a left side view of the inner plate.
Figure 9:
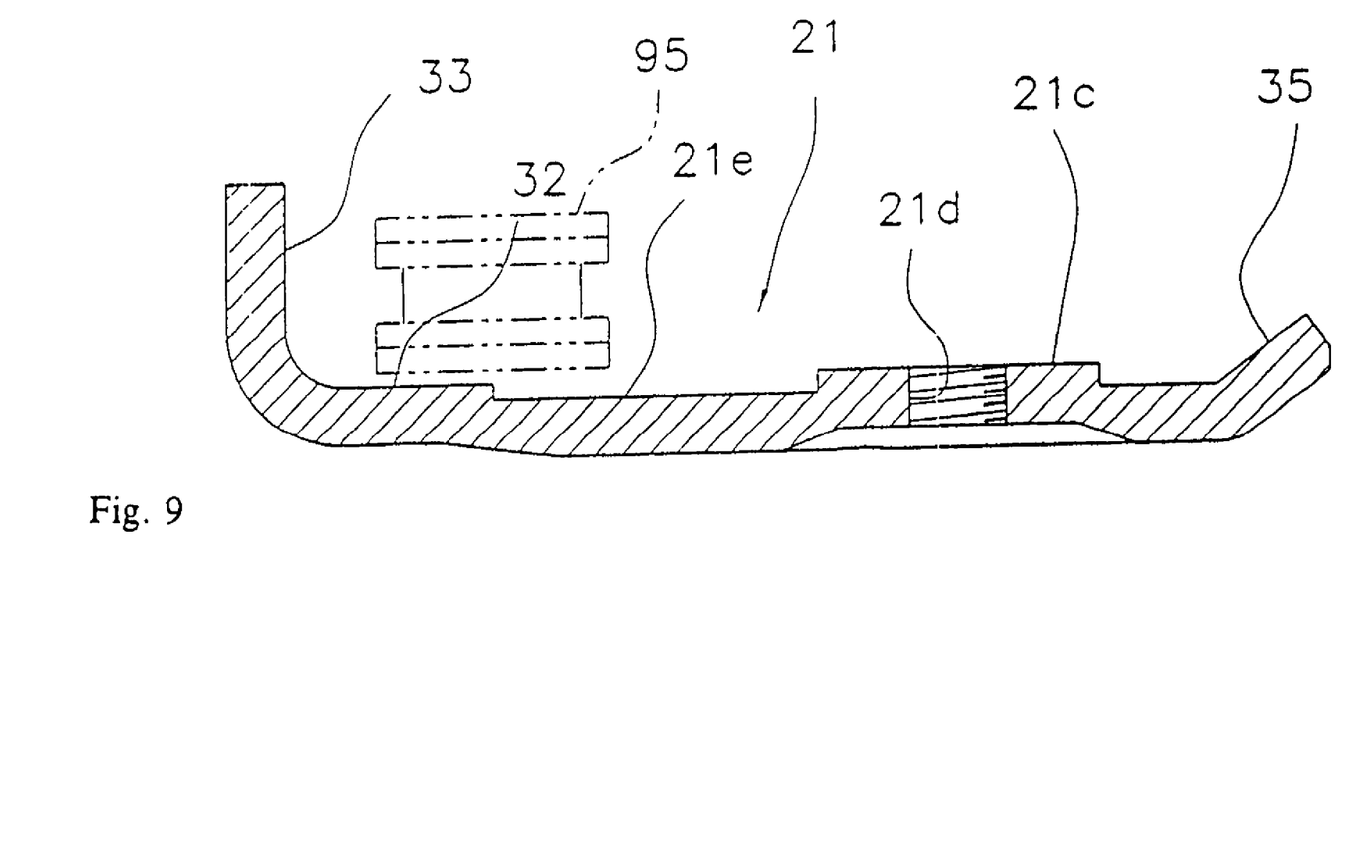
FIG. 9 is an IX-IX cross-sectional view of FIG. 8.

As shown in FIGS. 8 and 9, Inner Plate 21 is a component which is formed by the press-molding of light-weight metals, such as aluminum alloy. Moreover, FIG. 8 is a view of Inner Plate 21 as seen from the outside. On one end of Inner Plate 21, First Boss 21a is formed at a position facing First Boss 20b of Outer Plate 20. On First Boss 21a, Pass-through Hole 21b, through which Supporting Axis 30 supporting Guide Pulley 22 passes, is formed. On another end of Inner Plate 21, Second Boss 21c, which supports Tension Pulley 23 in a freely rotatable manner, is formed. On Second Boss 21c, Female Screw 21d, into which Supporting Axis 31 which supports Tension Pulley 23 is screwed, is formed. First Boss 21a and Second Boss 21c are formed so as to be positioned on the same plane.

In the area surrounding Second Boss 21c of Inner Plate 21, two Arms 21e and 21f, which extend from Second Boss 21c; and Arch 21g, which takes a circular-arc shape and connects Arms 21e and 21f, are formed. Arch 21g is positioned in the area extending downward from and rearward of Second Boss 21c.

With regards to the area of Arch 21g which faces Chain 95, at the position which becomes the downstream when the pedals are pushed in the normal rotational direction (in the traveling direction), Chain Return Section 32 is formed. Chain Return Section 32 is formed in order to assist the chain to return to Tension Pulley 23 through pedaling action when the tension placed on Chain 95 becomes weaker and Chain 95 falls off.

Chain Return Section 32 is formed in such a manner that the clearance from Chain 95 is narrower at the position proximal to Second Boss 21c, onto which Tension Pulley 23 is mounted, as compared to the clearance at other portions. Specifically, Chain Return Section 32 is structured by a protrusion which is formed thicker than at other portions on Arch 21g.

On the rear portion of Chain Return Section 32, Chain Falling-off Prevention Mechanism 33, which is formed by bending the portion outwards, is installed. Chain Falling-off Prevention Mechanism 33 is installed in order to prevent Chain 95 from falling off from Tension Pulley 23. Specifically, this mechanism prevents Chain 95 from falling off backwards. On the front of Chain Return Section 32, Contact Prevention Mechanism 34, which prevents Inner Plate 21 from coming into contact with the spoke of Rear Wheel 106r when it undulates forwards, is installed.

Guide Pulley 22 is capable of aligning the engagement center of Chain 95 to the engagement center of any of Sprockets R1 to R10, and is installed in order to guide Chain 95 to any of Sprockets R1 to R10. Guide Pulley 22 is mounted onto Supporting Axis 30 by means of a ball bearing (not shown in Figures) in a freely rotatable manner. As illustrated in FIG. 10, the Guide Pulley is mounted between First Bosses 20b and 21a. Clearance L4 between First Bosses 20b and 21a is set wider by 1 mm to 1.5 mm than the maximum width of Guide Pulley 22. Therefore, Guide Pulley 22 is mounted onto Supporting Axis 30 so as to move in the axial direction by a maximum of 1.5 mm.

Tension Pulley 23 is installed in order to apply tension to Chain 95. Tension Pulley 23 is mounted onto Supporting Axis 31 by means of a ball bearing (not shown in the figures) in a freely rotatable manner. Between Second Boss 20d and Second Boss 21c, Tension Pulley 23 is deflected towards Second Boss 20d, and is arranged so that it cannot move in the axial direction.

Therefore, as an example, two Washers 35 and 36 are mounted between Second Boss 21c and Tension Pulley 23. When Guide Pulley 22 is located at a position closest to Outer Plate 20, the engagement center of the Tension Pulley 23 is offset from the engagement center of the Guide Pulley 22 by more than 0.5 mm in a direction towards Outer Plate 20 (the position of the Guide Pulley 22b is shown by the two-dot-chain line in FIG. 10). FIG. 10 shows the offset at this time by Distance L3. Furthermore, when Guide Pulley 22 is located at a position closest to Inner Plate 21, the engagement center of Tension Pulley 23 is offset from the engagement center of Guide Pulley 22 by less than 2.0 mm in a direction towards Outer Plate 20 (the position of Guide Pulley 22a is shown by the two-dot-chain line in FIG. 10). FIG. 10 shows the offset at this time by Distance L2.

In Rear Derailleur 97r structured as stated above, when Inner Cable 115a of Gear Cable 115r is pulled by Gear Shifter 110r, Chain Guide 13 is shifted inwards lower by means of Link Mechanism 11—namely to Sprocket R1; thus, it is loosened outwards towards the top—namely to Sprocket R10.

Under conditions in which Chain 95 is derailed onto the top Sprocket F2 on the front, and onto the top Sprocket R10 on the rear, if the gear is shifted downwards by means of Gear Shifter 110f, Chain Guide 13 suddenly undulates forward, and the tension placed on Chain 95 becomes weak. In such case, the tension becomes weak because Chain 95 is pulled inwards, and Chain 95 occasionally falls off from Tension Pulley 23. Because the chain used for gear shifting is designed to be flexible so that gear shifting can be conducted easily, it occasionally falls off under such conditions. In such cases, Chain Return Section 32 is formed as a protrusion so that the clearance from Chain 95 at this portion is narrower than at other portions, and Chain 95 is pressed by means of Chain Return Section 32 when Chain 95 travels towards Guide Pulley 22 by means of pedaling action. Because of this, the position of Chain 95 is corrected outwards, becomes inclined towards Tension Pulley 23, and thus is caught by Tension Pulley 23 more easily. As a result, Chain 95, which has fallen off from Tension Pulley 23, can be returned more easily without stopping Bicycle 101.

Furthermore, when the tension becomes weak, the movement of Guide Pulley 22 in the axial direction might be hindered. However, in this preferred embodiment, because the engagement center of Tension Pulley 23 is offset from the engagement center of Guide Pulley 22 in a direction towards Outer Plate 20, Guide Pulley 22 is pulled by Chain 95 outwards more easily; therefore, Guide Pulley 22 moves outwards more easily even when the tension of Chain 95 is weak. Therefore, Chain 95 can be guided to either one of Sprockets R1 to R10 more smoothly.

In the foregoing preferred embodiments, a manually-operated rear derailleur for a road racer was explained. However, the present invention is not limited to this example, and can be applied to any rear derailleur, as long as it is equipped with a guide pulley and a tension pulley. It may also be electrically operated. Additionally, in the foregoing preferred embodiments, the outer plate was curved so that the tension pulley was offset to the guide pulley. However, the offset may be also achieved by utilizing a washer, without curving the outer plate.

The foregoing embodiments are merely examples of the present invention. Those skilled in the art my make numerous uses of, and departures from, such embodiments without departing from the spirit and scope of the present invention. Accordingly, the scope of the present invention is not to be limited or defined by such embodiments in any way, but rather, is defined solely by the following claims.

What is claimed is:

1. A bicycle rear derailleur, which is mounted on a bicycle frame so as to selectively derail the chain resting upon any of a multiple number of sprockets mounted on a rear hub axis, which is equipped with a base component, which is mounted onto the aforementioned frame; a link mechanism, one end of which is mounted on the aforementioned base component; a movable component, which is mounted on the other end of the aforementioned link mechanism, and which can be relatively displaced from the aforementioned base component; an outer plate, which is mounted on the aforementioned movable component so as to undulate like a see-saw; an inner plate, which is installed so as to face the aforementioned outer plate; a guide pulley, which is mounted onto a portion onto one edge of the aforementioned plates, between the aforementioned plates, so as to freely rotate and move in the axial direction, and which can be engaged by means of the aforementioned chain; and a tension pulley, which can be engaged with the aforementioned chain, the engagement center of which is set at a position closer to the aforementioned outer plate than to the engagement center of the aforementioned guide pulley, and which is mounted onto a portion on the other edge of the aforementioned plates, between the aforementioned plates, so as to freely rotate.

2. The bicycle rear derailleur of claim 1, wherein the side of the aforementioned outer plate, onto which the aforementioned tension pulley is mounted, curves midway outwards so as to be positioned further outwards than the side onto which the aforementioned guide pulley is mounted.

3. The bicycle rear derailleur of claim 2, wherein the engagement center of the aforementioned tension pulley is set at a position closer to the aforementioned outer plate than to the engagement center of the aforementioned guide pulley, when the aforementioned guide pulley is located at a position closest to the aforementioned outer plate.

4. The bicycle rear derailleur of claim 3, wherein the engagement center of the aforementioned tension pulley is offset by more than 0.5 mm closer to the aforementioned outer plate than to the engagement center of the aforementioned guide pulley, when the aforementioned guide pulley is located at a position closest to the aforementioned outer plate.

5. The bicycle rear derailleur of claim 3, wherein the engagement center of the aforementioned tension pulley is offset by less than 2.0 mm closer to the aforementioned outer plate than to the engagement center of the aforementioned guide pulley, when the aforementioned guide pulley is located at a position closest to the aforementioned inner plate.

6. The bicycle rear derailleur of claim 4, wherein the engagement center of the aforementioned tension pulley is offset by less than 2.0 mm closer to the aforementioned outer plate than to the engagement center of the aforementioned guide pulley, when the aforementioned guide pulley is located at a position closest to the aforementioned inner plate.

7. The bicycle rear derailleur of claim 2, wherein the engagement center of the aforementioned tension pulley is offset by more than 0.5 mm closer to the aforementioned outer plate than to the engagement center of the aforementioned guide pulley, when the aforementioned guide pulley is located at a position closest to the aforementioned outer plate.

8. The bicycle rear derailleur of claim 7, wherein the engagement center of the aforementioned tension pulley is offset by less than 2.0 mm closer to the aforementioned outer plate than to the engagement center of the aforementioned guide pulley, when the aforementioned guide pulley is located at a position closest to the aforementioned inner plate.

9. The bicycle rear derailleur of claim 2, wherein the engagement center of the aforementioned tension pulley is offset by less than 2.0 mm closer to the aforementioned outer plate than to the engagement center of the aforementioned guide pulley, when the aforementioned guide pulley is located at a position closest to the aforementioned inner plate.

10. The bicycle rear derailleur of claim 1, wherein the engagement center of the aforementioned tension pulley is set at a position closer to the aforementioned outer plate than to the engagement center of the aforementioned guide pulley, when the aforementioned guide pulley is located at a position closest to the aforementioned outer plate.

11. The bicycle rear derailleur of claim 10, wherein the engagement center of the aforementioned tension pulley is offset by more than 0.5 mm closer to the aforementioned outer plate than to the engagement center of the aforementioned guide pulley, when the aforementioned guide pulley is located at a position closest to the aforementioned outer plate.

12. The bicycle rear derailleur of claim 11, wherein the engagement center of the aforementioned tension pulley is offset by less than 2.0 mm closer to the aforementioned outer plate than to the engagement center of the aforementioned guide pulley, when the aforementioned guide pulley is located at a position closest to the aforementioned inner plate.

13. The bicycle rear derailleur of claim 10, wherein the engagement center of the aforementioned tension pulley is offset by less than 2.0 mm closer to the aforementioned outer plate than to the engagement center of the aforementioned guide pulley, when the aforementioned guide pulley is located at a position closest to the aforementioned inner plate.

14. The bicycle rear derailleur of claim 1, wherein the engagement center of the aforementioned tension pulley is offset by more than 0.5 mm closer to the aforementioned outer plate than to the engagement center of the aforementioned guide pulley, when the aforementioned guide pulley is located at a position closest to the aforementioned outer plate.

15. The bicycle rear derailleur of claim 14, wherein the engagement center of the aforementioned tension pulley is offset by less than 2.0 mm closer to the aforementioned outer plate than to the engagement center of the aforementioned guide pulley, when the aforementioned guide pulley is located at a position closest to the aforementioned inner plate.

16. The bicycle rear derailleur of claim 1, wherein the engagement center of the aforementioned tension pulley is offset by less than 2.0 mm closer to the aforementioned outer plate than to the engagement center of the aforementioned guide pulley, when the aforementioned guide pulley is located at a position closest to the aforementioned inner plate.

17. A bicycle derailleur pulley assembly, comprising:
   a. a plate assembly, including a first plate and a second plate;
   b. a guide pulley rotatably connected to said plate assembly between said first plate and said second plate, said guide pulley having a guide pulley center;
   c. a tension pulley rotatably connected to said plate assembly between said first plate and said second plate, said tension pulley having a tension pulley center;
   wherein, said guide pulley center and said tension pulley center define a first distance, said tension pulley center and said second plate define a second distance, and wherein said second distance is less than said first distance.

18. The bicycle derailleur pulley assembly of claim 17, wherein said second plate comprises a guide pulley section and a tension pulley section, said guide pulley being located at said guide pulley section and said tension pulley being located at said tension pulley section, and wherein said tension pulley section is offset from said guide pulley section.

19. A method of assembling a bicycle derailleur, comprising:
   a. providing a plate assembly having first and second plates;
   b. providing a guide pulley rotatably connected to said plate assembly between said first and second plates, said guide pulley having a guide pulley center;
   c. providing a tension pulley rotatably connected to said plate assembly between said first and second plates, said tension pulley having a tension pulley center, wherein said guide pulley center and said tension pulley center define a first distance between said guide pulley center and said tension pulley center, and said tension pulley center and said second plate define a second distance between said tension pulley center and said second plate; and
   d. creating an offset between said first distance and said second distance, such that said second distance is less than said first distance.

20. A bicycle derailleur, comprising:
   a. a base component adapted to be mounted to a bicycle frame;
   b. a link mechanism having a first end connected to said base component and further having a second end;
   c. a movable component connected to said second end of said link mechanism, said movable component being adapted for relative displacement away from said base component;
   d. a plate assembly, comprising an inner plate and an outer plate, said outer plate being connected to said movable component and said inner plate being connected to said outer plate;
   e. a guide pulley rotatably connected to said plate assembly between said inner plate and said outer plate, said guide pulley having a guide pulley center;
   f. a tension pulley rotatably connected to said plate assembly between said inner plate and said outer plate, said tension pulley having a tension pulley center;
   wherein said guide pulley center and said tension pulley center define a first distance, said tension pulley center and said second plate define a second distance, and wherein said second distance is less than said first distance.

* * * * *